T. E. STRAUS.
COTTON PICKER.
APPLICATION FILED JAN. 10, 1913.

1,174,527.

Patented Mar. 7, 1916.
3 SHEETS—SHEET 1.

Witnesses

Inventor
Theodore E. Straus
By Sturtevant & Mason
Attorneys

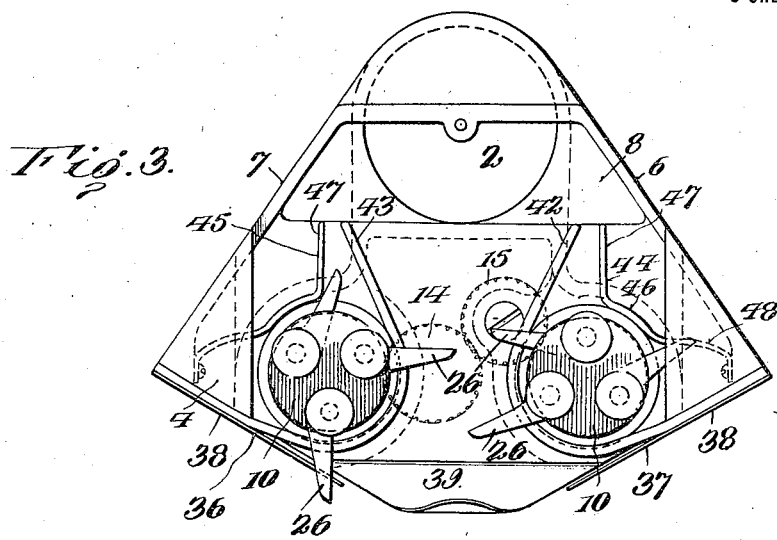
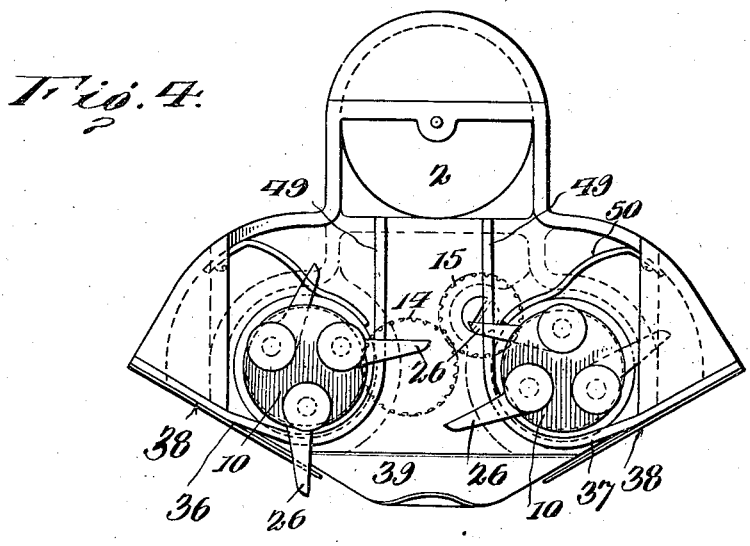

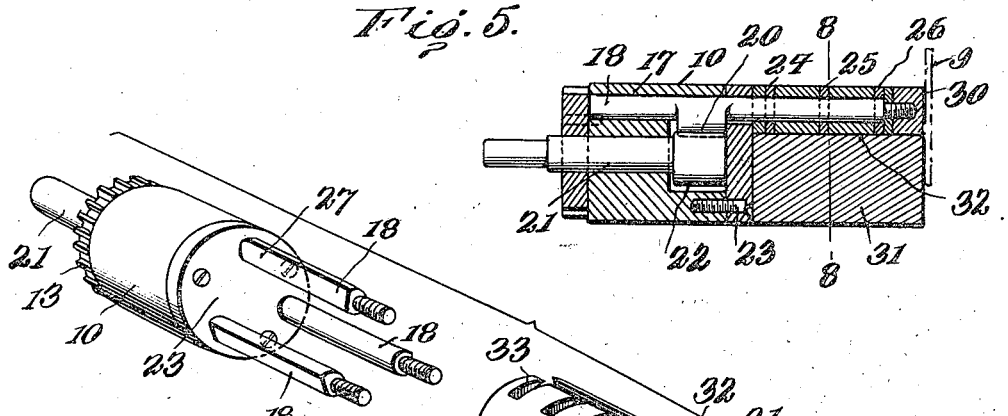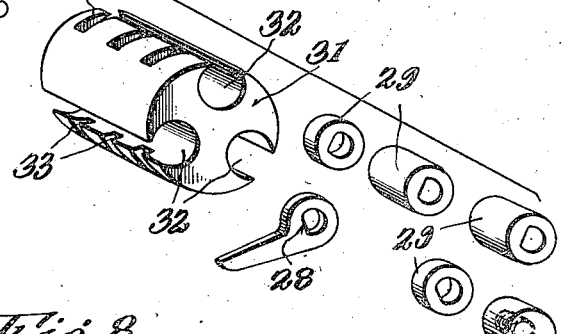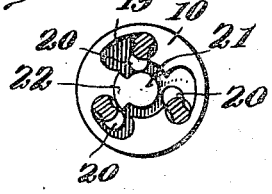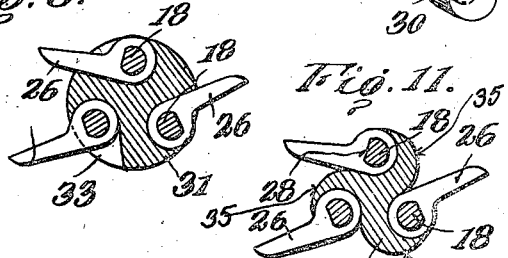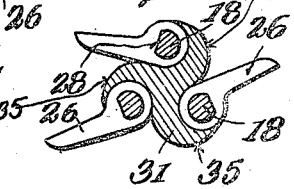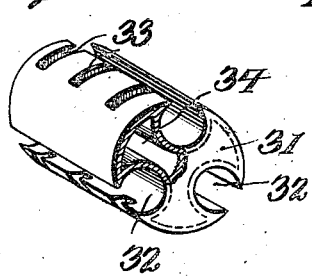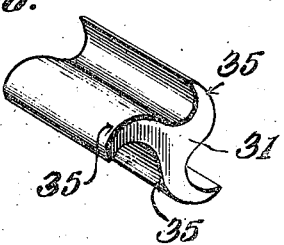

UNITED STATES PATENT OFFICE.

THEODORE E. STRAUS, OF BALTIMORE, MARYLAND, ASSIGNOR TO WORTHINGTON COTTON HARVESTER COMPANY, OF BALTIMORE, MARYLAND, A CORPORATION OF DELAWARE.

COTTON-PICKER.

1,174,527.          Specification of Letters Patent.        Patented Mar. 7, 1916.

Application filed January 10, 1913. Serial No. 741,289.

*To all whom it may concern:*

Be it known that I, THEODORE E. STRAUS, a citizen of the United States, residing at Baltimore, in the State of Maryland, have invented certain new and useful Improvements in Cotton-Pickers, of which the following is a description, reference being had to the accompanying drawing and to the figures of reference marked thereon.

The invention relates to new and useful improvements in cotton pickers, and more particularly to the structure of the picking nozzle which removes the cotton fiber from the cotton boll and directs the same to a suction-controlled intake passage.

An object of the invention is to provide a picking nozzle having mechanical picking fingers with means for stripping the cotton fiber from said fingers, and with devices operating subsequently upon said fingers to clean and clear said picking fingers of any remaining cotton fiber.

A further object of the invention is to provide a picking nozzle having mechanical picking fingers with strippers for removing the cotton fiber from the fingers, which strippers are so shaped that the cotton fiber is readily freed therefrom as soon as the fiber is stripped from said fingers.

A further object of the invention is to provide a picking nozzle with a relatively wide air-receiving chamber at a point between the suction passage and the point of stripping the cotton fiber from the picking fingers.

A further object of the invention is to provide a picking nozzle having supporting members for picking fingers with a device for filling the space between the supporting members, so as to prevent the cotton fiber from accumulating in and about the picking fingers and the supporting members therefor.

These and other objects will in part be obvious, and will in part be hereinafter more fully disclosed.

Figure 1:
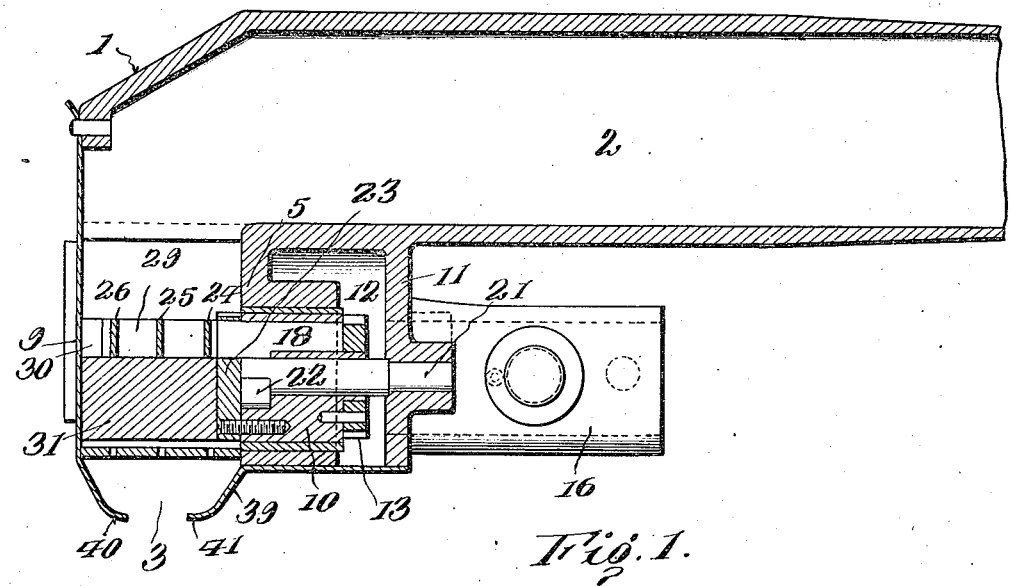
Figure 2:
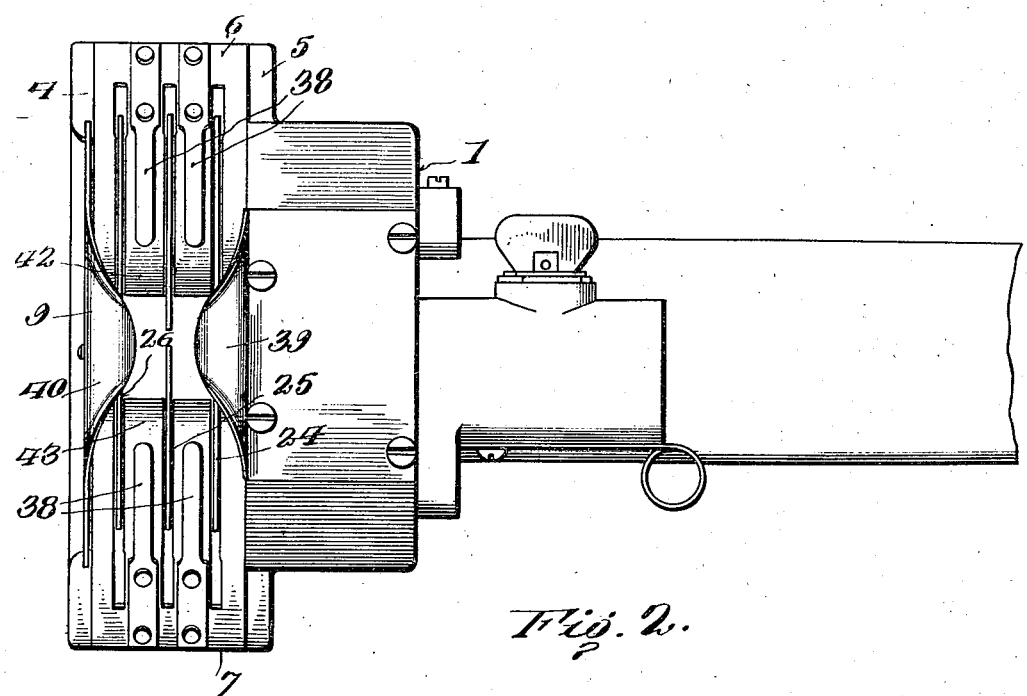

In the drawings, which show by way of illustration one embodiment of the invention,—Figure 1 is a longitudinal sectional view through a picking nozzle having my improvements applied thereto; Fig. 2 is a bottom plan view of my improved picking nozzle; Fig. 3 is an end view thereof, the closing front plate being removed; Fig. 4 is a view similar to Fig. 3, showing a slightly modified form of the invention; Fig. 5 is a longitudinal sectional view through the supporting drum and the support for one set of picking fingers; Fig. 6 is a detached perspective view, showing the supporting drum, the supporting rods for the picking fingers, the spacing washers and the filling member or shell; Fig. 7 is a detail showing the supporting drum in end view and the supporting rods in section; Fig. 8 is a sectional view on the line 8—8 of Fig. 5; Fig. 9 is a detail in perspective showing a slightly modified form of the filling shell; Fig. 10 is a detail in perspective showing another modified form of filling member; and Fig. 11 is a detail in section, showing the filling member of Fig. 10 and its relation to the supporting rods for the picking fingers.

My improved picking device consists of a casing 1 having an intake passage 2, and an intake picking mouth 3, which extends transversely of the casing. Said casing at its inner end is in the form of a sleeve adapted to be attached to a flexible conveying pipe, which in turn is connected to any suitable source of suction. The casing is extended laterally and downwardly, so as to form a picking head, which is provided with a picking mouth above referred to. The intake passage 2 of the casing extends to the picking mouth.

The casing is formed with side walls 4 and 5, which extend transversely of the picking head. These walls 4 and 5 are joined by end walls 6 and 7. The end walls are preferably formed on straight lines, as shown in Fig. 3. These walls are of relatively thin metal, so as to form a chamber 8, which leads to the suction intake passage 2. The chamber 8 is relatively large, and permits the inrushing air to carry the cotton fiber into the suction passage 2, without any liability of the fiber clogging in and about the shoulders or recesses formed on the inner face of the nozzle.

As clearly shown in Fig. 3, the side walls 6 and 7 are inclined, and, therefore, great freedom is given for the passage of the cotton fiber from the mechanical picking devices to the suction intake passage 2.

It will be understood that the side walls 6 and 7 may be perforated to permit a considerable amount of inrushing air to assist in carrying the cotton fiber to the suction passage, although the certain proportion of the inrushing air passes through the intake mouth 3 of the nozzle.

The front wall of the nozzle is cut away and grooved to receive a sliding plate 9, which may be held in place in any suitable way. Located within the picking nozzle and on each side of the intake passage is a supporting drum or carrier 10. These rotating carriers are of precisely the same construction, and the description of one will answer for the other. The picking nozzle is provided with a third transverse wall 11, see Fig. 1, which forms a chamber 12 for the operating member for the carriers for the operating fingers.

The wall 5 is formed with a projecting portion extending into the chamber 12, and the carrier 10 is journaled in a suitable sleeve inserted in this projecting portion of the wall 5. The carrier at its inner end is provided with a gear wheel 13. This gear wheel 13 on one carrier meshes with a gear wheel 14, shown in dotted lines in Fig. 3, and the gear wheel of the other carrier meshes with a gear wheel 15, which in turn meshes with the gear wheel 14. By this intergearing of the carriers, said carriers will rotate in unison, but in opposite directions. The carriers are driven from a suitable flexible shaft, which extends into the sleeve 16, carried by the wall 11 of the picking nozzle.

Referring to Fig. 5, it will be noted that the carrier or drum 10 is formed with an opening 17, into which extends a rod 18. The other end of the rod 18 projects from the carrier or drum, and serves as the supporting rod for the picking fingers. Each carrier is provided with three supporting rods, as herein shown.

The carrier or drum is cut away to form recesses 19. Each rod 18 is formed with a projection 20, which is adapted to swing in the recess 19. Centrally of the drum is a fixed spindle 21, carrying a cam segment 22 at its outer end. This cam segment will engage the projecting portions 20 of the picker finger supporting rods, during certain portions of the rotation of the carrier or drum, and when said segment engages the projecting portion of the supporting rod, said supporting rod will be held rigidly against any oscillating or turning movement about its axis. At other times said supporting rods are free from the segment, and free to oscillate about their axes.

A face plate or cap 23 is screwed to the front end of the drum or carrier, and serves to hold the supporting rods assembled in the carrier or drum. The drum or carrier is held in its bearing through the fixed spindle 21, which projects from the carrier or drum into the wall 11 and is fixed thereto.

On each supporting rod is a set of picking fingers 24, 25 and 26. The supporting rod is formed with a flat face 27, and each picking finger is formed with a similar flat section 28, which engages the flat face 27, so as to prevent the picking fingers from rotating relative to the supporting rods therefor. The picking fingers are spaced from each other by suitable washers 29, which are also formed with a flat face to engage the flat face on the supporting rods. These washers 29 are made of the same diameter as the curved portion of the shank of the picking finger, so that when the picking fingers and washers are assembled on the supporting rods therefor, the outer face is smooth and free from all projecting shoulders. The picking fingers and washers are held on the supporting rods by a cap nut 30, which is screwed on to the threaded end of the supporting rod, and this cap nut 30 is also of the same diameter as the spacing washers and curved shanks of the picking fingers, so that there are no projecting parts to engage the cotton fiber.

In order to prevent the cotton fiber, especially when wet, from gradually accumulating in and about the supporting rods for the picking fingers, I have provided a filling member 31, which is cylindrical in outline and of a length to extend from the outer face of the drum or carrier substantially to the outer face of the cap nuts 30, on the ends of the picker rods. This filling member 31 is formed with cylindrical recesses 32, one for each supporting rod. When the filling member is slid in between the supporting rods, the entire inner space between the rods, (that is, between the shanks of the picking fingers and spacing washers,) is entirely filled.

The recesses 32 are so located in the filling member that the surface of the filling member is cut, forming a space substantially the same width as the shank of the picking finger. This permits the filling member to be readily slid on to the supporting rods after the picking fingers have been assembled.

The filling member 31 is formed with slots 33, which extend circumferentially and radially into the wall of the filling member, directly in rear of the picking finger. The purpose of this slot is to permit the picking finger when the filling member is in place, to swing when released from the segment cam 22, as above described. It will be understood that the sets of picking fingers are released at different points, and as a consequence, one set of picking fingers will always be in engagement with the slot in rear thereof, while some other set is rigid and active. These slots, therefore, serve to hold the filling member in proper position on the supporting rods. Other means, however, may be used for holding the filling member in place, such as a screw for securing the same to the cap plate 23 on the drum or carrier.

From the above construction, it will be apparent that the filling member closes the entire space between the supporting rods and extends about the supporting rods substantially to the outer face thereof. The slots 33 are directly in rear of the picking fingers, and, therefore, by the use of my filling member, I have provided a picking device wherein the picking fingers are at times held rigid for removing the fiber from the cotton boll, and at times allowed to swing free, so that the fiber may be stripped therefrom, and at the same time said picking device is practically free from any projecting shoulders or ledges, or from any pockets or recesses in which the cotton fiber can accumulate, and thus obstruct and render ineffective the picking action.

In Fig. 9 of the drawings, I have shown a filling member 31, which is in the form of a shell. In other words, said filling member is cut away as at 34, so as to lighten the weight of the filling member.

In Figs. 10 and 11 of the drawings, I have shown a further modified form of filling member, wherein the outer faces 35 of the filling member 31 are formed eccentric to the axis of rotation of the carrier. In this form of the filling member, the surface thereof directly in rear of the picking tooth is cut away or depressed throughout the entire width of the filling member, to a sufficient extent to allow the picking finger to swing, as above described.

As a means for stripping the cotton fiber from the cotton boll, I have formed the picking nozzle with inclined faces 36 and 37, and along each face I have provided stripping fingers 38, which extend between the picking fingers, as clearly shown in Fig. 2. I have also provided stripping plates 39 and 40. The stripping plate 39 is attached to one side of the picking nozzle, and extends downwardly, as shown at Fig. 1, and is curved inwardly, as at 41, so as to project over the center portion of the picking mouth of the picking nozzle.

The plate 40 is formed, as herein shown, as an extension of the closing end plate 9. This plate 40 also extends downwardly, and is curved inwardly over the intake mouth similar to the plate 39. These plates extending inwardly over the mouth of the picking nozzle contract the mouth, and separate the same into two picking regions, one on each inclined face thereof. The curving of the plates, as above noted, allows the picking fingers 25 to carry the cotton fiber into the mouth and into the intake passage of the nozzle without crowding or wedging the cotton fiber between the picking finger and the stripping plates 39 and 40. These stripping plates engage the twigs and husks of the cotton boll, and allow the cotton fiber to be stripped therefrom.

As a means for stripping the cotton fiber from the picking teeth, I have provided stripping fingers 42 and 43. These stripping fingers are alike in construction and are rigidly attached to the picking nozzle at the outer face thereof, extend about the supporting rods for the picking fingers, and are spaced so as to allow the picking fingers to move outwardly between the stripping fingers, penetrate the cotton fiber and carry the same to the intake passage. The inner ends of the stripping members 42 and 43 are deflected outwardly or laterally away from the central plane of the intake passage, as clearly shown in Fig. 3.

When the cotton fiber carried by the picker finger is brought to the intake passage, and the picking finger released so it can swing about the axis of the supporting rod therefor, said cotton fiber will be crowded outwardly on the picking fingers by the stripping members 42 and 43, and gradually removed therefrom. By this shaping of the stripping members so they are deflected outwardly, I have provided a construction wherein the intake passage through which the cotton fiber is passing, gradually increases in width from a point where the cotton fiber is stripped from the mechanical picking fingers, so that said cotton fiber may be readily picked up by the suction of the inrushing air and carried along therewith. Furthermore, by this outward bending or deflecting of the stripper members 42 and 43, I am able to bring the inner or stripping face thereof more nearly into a line tangential to the path of movement of the picking fingers, and thereby the cotton fiber may be more readily stripped therefrom.

As a means for cleaning and clearing the picking fingers from any cotton fiber which may be carried by the stripper members 42 and 43, I have provided cleaning strippers 44 and 45. These cleaning strippers are alike in construction; they are secured to the outer wall of the nozzle by suitable means, and project inwardly toward the rotating supporting rods. Said cleaning strippers are curved, as at 46, substantially about the axis of rotation of the carrier or drum, and are thence bent outwardly, as at 47, so as to lie substantially radially of the drum.

As the picking finger leaves the stripping members 42, it will pass between the cleaning strippers 45 or 46, and these cleaning strippers are closely spaced, so as to engage any cotton fiber carried by the fingers and remove the same therefrom. The outwardly projecting portion 47 will first engage and remove any fiber carried by the picking finger, and the outwardly projecting portion 48, which serves as a means for supporting the cleaning strippers will operate also upon the picking finger as it passes between the same, to further remove cotton fiber carried along by said picking finger.

Inasmuch as the side walls of the nozzle are perforated, there is sufficient inrushing air at the sides of the nozzle to pick up any fiber cleaned or cleared from the picking fingers by these cleaning strippers, and carry the same to the intake passage. It will, therefore, be apparent that I have provided means for cleaning and clearing the picking fingers subsequent to the stripping of the cotton fiber from said picking fingers, and prior to the picking fingers becoming again active for engaging the cotton fiber and stripping the same from the cotton boll. While I have shown cleaning strippers for this purpose, it is to be understood that my invention contemplates other devices and other ways of cleaning or clearing the picking fingers from the cotton fiber remaining thereon, and I, therefore, do not limit myself to the present illustrated embodiment of the invention.

In Fig. 4 of the drawings, I have shown a construction of nozzle wherein the stripping members 49, which coöperate with the picking fingers for stripping cotton fiber therefrom, extend into the intake passage and lie substantially parallel with each other. As a means for cleaning or clearing the picker fingers in a construction of this character, I have provided cleaning strippers 50, which are closely spaced and between which the picking fingers pass. These cleaning strippers operate to remove any cotton fiber from the picking fingers which may remain thereon after the picking fingers are withdrawn from the bulk of the cotton fiber by the action of the strippers 49. These cleaning strippers are secured to the inner face of the picking nozzle, and project toward the carrier for the picking fingers, as clearly shown in Fig. 4 of the drawings.

It will be obvious that minor changes in the details of construction and arrangement of parts may be made, without departing from the spirit of the invention, as set forth in the appended claims.

Having thus described my invention, what I claim as new and desire to secure by Letters Patent, is:—

1. A cotton picking device including in combination, a picking nozzle, picking fingers rotatably mounted in said picking nozzle and movable beyond the same to engage the cotton fiber, and relatively stationary devices located within said picking nozzle and coöperating successively with each picking finger, one of said devices operating to strip the cotton fiber from the fingers and the other to clear any remaining cotton fiber from said fingers.

2. A cotton picking device including in combination a picking nozzle, a rotating picker carrier located in said nozzle, picking fingers carried thereby and projecting from the nozzle for engaging the cotton fiber, relatively stationary devices located within said nozzle for stripping the cotton fiber from the picking fingers, and relatively stationary devices located within said nozzle and operating subsequently upon said picking fingers for clearing any remaining cotton fiber from said picking fingers.

3. A cotton picking device including in combination, a picking nozzle, having an intake passage, a rotating carrier located at each side of said intake passage, picking fingers mounted on each carrier, relatively stationary stripping devices coöperating with said picking fingers for stripping the cotton fiber therefrom, and cleaning strippers coöperating with said picking fingers after they pass said first named strippers for cleaning and clearing any remaining cotton fiber therefrom.

4. A cotton picking device including in combination, a picker nozzle, a rotating carrier, picker fingers mounted on said rotating carrier, devices for engaging the cotton boll and holding the same while the cotton fiber is stripped therefrom, relatively stationary devices for stripping the cotton fiber from the mechanical picking fingers, and means operating subsequently upon said picking fingers for cleaning and clearing any remaining cotton fiber from the picking fingers.

5. A cotton picking device including in combination a picking suction nozzle having a central intake passage, a rotating picking carrier at each side of said passage, picking fingers mounted upon said carriers, stripping devices at each side of the nozzle for stripping the cotton fiber from the picking fingers on the respective carriers, said stripping devices being so disposed that the space between the opposed faces of said devices increases inwardly so as to release the cotton fiber as soon as it is stripped from the picking fingers.

6. A cotton picking device including in combination a picking suction nozzle having a central intake passage, a rotating picking carrier at each side of said passage, picking fingers mounted upon said carriers, stripping devices at each side of the nozzle for stripping the cotton fiber from the picking fingers on the respective carriers, said stripping devices being so disposed that the space between the opposed faces of said devices increases inwardly so as to release the cotton fiber as soon as it is stripped from the picking fingers, and devices operating upon the picking fingers to clean and clear the cotton fiber therefrom after said fingers leave the strippers.

7. A cotton picking device including in combination, a picking suction nozzle having a central intake passage, a rotating carrier at each side of said passage, picking fingers mounted on each carrier, and stripping members secured at their outer ends to the outer face of said nozzle and extending about the respective carriers into the intake passage, the inner ends of said stripping devices extending gradually away from each other, so as to form a relatively wide intake passage at the points where the cotton fiber is stripped from the picking fingers.

8. A cotton picking device including in combination, a picking nozzle, a rotating carrier located within said nozzle, supporting members projecting from said carrier, means for oscillating said supporting members on said carrier as it rotates, laterally spaced picking fingers mounted on said supporting members, and means for filling the space interior of and between the supporting members, whereby the cotton fiber is prevented from accumulating in and about said supporting members.

9. A cotton picking device including in combination, a rotating carrier, picker-supporting rods projecting therefrom, picking fingers mounted on said supporting rods, washers for spacing said picking fingers, the shanks of said fingers and said washers being of substantially the same diameter, so as to prevent the catching of the cotton fiber and the accumulation of the same about said supporting rods.

10. A cotton picking device including in combination, a picking nozzle, a rotating carrier having supporting rods projecting therefrom, picking fingers mounted on said supporting rods, washers for spacing said picking fingers, and means for filling the space between said supporting rods, the outer face of said filling member being substantially flush with the outer face of the washers and the shanks of the picking fingers, said filling member being slotted in rear of the picking finger, so as to permit said picking finger to swing during the stripping of the cotton fiber.

11. A cotton picking device including in combination, a picking nozzle, a rotating carrier located in said nozzle, spaced supporting members projecting from the carrier so as to be moved bodily thereby, laterally spaced projecting picking fingers mounted on said supporting members, means for oscillating said members on the carrier as it rotates, and means for preventing the accumulation of the cotton fiber in and about the supporting devices for said picking fingers.

In testimony whereof, I affix my signature, in the presence of two witnesses.

THEODORE E. STRAUS.

Witnesses:
A. M. PARKINS,
E. G. MASON.